US007653814B2

(12) United States Patent
Carro (10) Patent No.: US 7,653,814 B2
(45) Date of Patent: Jan. 26, 2010

(54) SYSTEM AND METHOD FOR SECURELY HYPERLINKING GRAPHIC OBJECTS

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 1449 days.

(21) Appl. No.: 10/315,708

(22) Filed: Dec. 10, 2002

(65) Prior Publication Data

US 2003/0110384 A1    Jun. 12, 2003

(30) Foreign Application Priority Data

Dec. 11, 2001   (EP)   ................... 01480129

(51) Int. Cl.
*H04L 9/32* (2006.01)
*G06F 17/00* (2006.01)
(52) U.S. Cl. ............... 713/170; 713/176; 713/179; 713/180; 713/181; 715/207; 715/208
(58) Field of Classification Search ................ 713/170, 713/176; 715/208
See application file for complete search history.

(56) References Cited

U.S. PATENT DOCUMENTS

| 5,751,956 | A | * | 5/1998 | Kirsch | ................. | 709/203 |
| 5,892,900 | A | * | 4/1999 | Ginter et al. | ................. | 726/26 |
| 5,937,160 | A | * | 8/1999 | Davis et al. | ................. | 709/203 |
| 5,958,051 | A | | 9/1999 | Renaud et al. | | |
| 6,058,417 | A | * | 5/2000 | Hess et al. | ................. | 709/219 |
| 6,085,321 | A | | 7/2000 | Gibbs et al. | | |
| 6,122,403 | A | * | 9/2000 | Rhoads | ................. | 382/233 |
| 6,131,162 | A | * | 10/2000 | Yoshiura et al. | ................. | 713/176 |
| 6,167,522 | A | | 12/2000 | Lee et al. | | |
| 6,269,446 | B1 | * | 7/2001 | Schumacher et al. | ................. | 713/176 |

(Continued)

FOREIGN PATENT DOCUMENTS

WO       WO02101522 A2    12/2002

OTHER PUBLICATIONS

Ding, Chen. Chi, Chi-Hung. Tam, Vincent. "Reverse Mapping of Referral Links from Storage Hierarchy for Web Documents". Proceedings of ICTAI 2000. Pub. 2000. Relevant pp. 216-219. Found on the World Wide Web on: http://ieeexplore.ieee.org/stamp/stamp.jsp?tp=&arnumber=889873&isnumber=19247.*

(Continued)

*Primary Examiner*—Christopher A Revak
*Assistant Examiner*—Jeremiah Avery
(74) *Attorney, Agent, or Firm*—Schmeiser, Olsen & Watts; William H. Steinberg (57) ABSTRACT

Systems and methods and computer programs for verifying the authenticity and integrity of hyperlink addresses and files that are accessible by means of these hyperlink addresses. A system and a method are disclosed for authenticating a file such as an HTML document hyperlinked to a graphic object such as a digital image or to a graphic icon. The hyperlink network address (e.g., the URL of the hyperlink on the Internet) is encoded on a first portion of the graphic object. Checking information such as a MAC digital signature and the hyperlinked file are encoded into a second portion of the same graphic object. In accordance with another aspect of the invention, a system and a method are disclosed for verifying the authenticity and integrity of a hyperlink and a file when this hyperlink is activated.

14 Claims, 6 Drawing Sheets

U.S. PATENT DOCUMENTS

| | | | | |
|---|---|---|---|---|
| 6,760,463 B2 * | 7/2004 | Rhoads | ........................ | 382/100 |
| 6,775,392 B1 * | 8/2004 | Rhoads | ........................ | 382/100 |
| 6,813,366 B1 * | 11/2004 | Rhoads | ........................ | 382/100 |
| 6,870,931 B2 * | 3/2005 | Jones et al. | .................. | 380/219 |
| 7,095,854 B1 * | 8/2006 | Ginter et al. | ................. | 380/233 |
| 7,111,168 B2 * | 9/2006 | Lofgren et al. | .............. | 713/176 |
| 7,178,166 B1 * | 2/2007 | Taylor et al. | ................... | 726/25 |
| 7,203,838 B1 * | 4/2007 | Glazer et al. | ................. | 713/176 |
| 7,260,724 B1 * | 8/2007 | Dickinson et al. | ........... | 713/182 |

OTHER PUBLICATIONS

Bearman, et al.; "Authenticity of Digital Resources" Towards a Statement of Requirements in the Research Process; D-Lib Magazine, Jun. 1998; 13 pages; ISSN 1082-9873; http://www.dlib.org/dlib/june98/06bearman.html.

Garfinkel, et al.; "Practical UNIX and Internet Security"; Chapter 26, Computer Security and U.S. Law; pp. 779-798; Copyright 1999 O'Reilly & Associates, Inc.; http://9.29.109.8/ORA/tcpip/puis/ch26_04.htm#PUIS-CHP-26-SECT-4.2.1.

Sellars, Duncan; "An Introduction to Steganography"; 19 pages; http://www.cs.uct.ac.za/courses/CS400W/NIS/papers99/dsellars/stego.html#SECTION00070000000000000000.

"Secure Hash Standard"; Federal Information Processing Standards Publication, FIPS PUB 180-1; US Department of Commerce; Apr. 17, 1995; 24 pages.

Bender, et al.; "Techniques for data hiding"; IBM Systems Journal, vol. 35, Nos. 3&4, 1996; pp. 313-336.

Schneier, Bruce; "Applied Cryptography"; published by John Wiley & Sons, 2nd edition, 1996; ISBN 0-471-11709-9; Paperback—784 pages; ISBN 0-471-12845-7; Hardcover—784 pages; 15 pages.

* cited by examiner

SYSTEM AND METHOD FOR SECURELY HYPERLINKING GRAPHIC OBJECTS

FIELD OF THE INVENTION

The present invention relates to the field of network computing security. More specifically, the present invention relates to a system and method for verifying authenticity and integrity of hyperlinks and files associated with these hyperlinks.

BACKGROUND

The most serious risk associated with the exchange of electronic information on open, unsecured networks, particularly on the Internet, may be that digital data can be easily modified during transfer. Therefore, the demand for more secure transfer systems has increased.

Most of today's transactions on the Internet involve access by the user to files on servers (e.g., on Web servers or mail servers) by activating hyperlinks. On open, unsecured networks, when a user selects and activates hyperlinks from a Web browser, or when a user clicks on the icons of file attachments on received e-mail, it is important to authenticate all linked and attached files prior to using them as intended. Such files may include, but are not limited to, computer programs, text documents, graphics, pictures, audio, video, or other information that is suitable for use within a computer system. Also, when a user selects and activates hyperlinks on open and unsecured networks, it is essential to be sure, not only of the authenticity and the integrity of the received (linked) files, but also that those files have been placed and are being accessed from trustworthy servers and from authenticated network addresses (i.e., from authenticated hyperlinks).

To illustrate these security concerns, if a document includes a hyperlink to an executable file or a software program, the user may wish to ensure, when activating the hyperlink, that the received file has been sent by a trustworthy party prior to exposing his computer system to a program file that might include a "Trojan Horse" or that could infect the user's computer with a virus. Also, when a user on the Internet receives data from a server, it may be necessary to verify that the received data has not been corrupted or otherwise altered in some manner. The receiving user may also need to verify that the data received was actually received from the proper sender, rather than from an impostor.

To improve the security of data transmitted over computer networks, while preventing digital forgeries and impersonations, document authentication and signer authentication safeguards must be used. The standard solution consists of adding a MAC or Message Authentication Code to the transmitted documents. A MAC is a digest computed with a one-way hash function over the document and which depends on a secret key, known only to the sender and the receiver. The MAC allows the receiver to check first that what is received has indeed been originated by the party who shares the secret-key, and second, that the document has not been altered. For example, the Secure Hash Algorithm or SHA specified by the National Institute of Standards and Technologies, NIST, FIPS PUB 180-1, "Secure Hash Standard", US Department of Commerce, May 1993, produces a 160-bit hash. It may be combined with a key (e.g., through the use of a mechanism referred to as HMAC or Keyed-Hashing for Message Authentication), subject of the RFC (Request For Comment) of the IETF (Internet Engineering Task Force) under the number 2104. HMAC is devised so that it can be used with any iterative cryptographic hash function including SHA. Therefore, a MAC can be appended to the transmitted document so that the whole document can be checked by the recipient.

For authenticating a document that includes a plurality of links to other files, not only the document, but also all the files linked to it must be authenticated. To deal with those very common cases, typically a single MAC is generated by applying a cryptographic hashing algorithm to an aggregate of the document and all linked files. When such an authenticated document and linked files are received, the verification algorithm must also be applied to the same aggregate of the received document and all linked files. However, the process of authenticating and verifying, and/or generating hash functions, places an additional overhead on the sending and receiving computational resources. Particularly, when a user receives a document that contains many hyperlinks to large files, the verification of the aggregate of the received document and all linked files would imply an excessive burden on the receiving computer resources and unacceptable delays on such computer network environments (e.g., if a received document is hyperlinked to one-hundred digital image files, each of them of about one megabyte, assuming that the average verification process takes one second on a personal computer, the user would have to wait for about 100 seconds after receiving the document, for securely accessing the verified files).

The prior art teaches methods for efficiently securing and verifying the authenticity of a plurality of data files, in particular data files intended to be transferred over computer networks. Most methods for verifying the authenticity of groups of data files provide, along with the group of data files, a separate signature file or MAC file. This MAC file includes individual check-values for the data files (e.g., hash-values) as well as a digital signature or a MAC value for the group. The digital signature of the group of files is verified using a computer system. Check-values in the signature file are compared with the corresponding values computed from the data files using the computer system. A typical method for generating a separate signature file for groups of data files is described in U.S. Pat. No. 5,958,051 "Implementing digital signatures for data streams and data archives", Renaud, et al., which is hereby incorporated herein by reference.

Obviously, methods using checking information in a separate file have the drawback of separating checked information and checking information (i.e., the signature or the MAC file). Therefore, the checking information can be intentionally removed in an attempt to cheat, or can be accidentally lost if intermediate equipment and the communication protocol used to forward electronic documents and data files are not devised to manipulate this extra piece of information. The checking information should then be encoded transparently into the body of the document in a manner that does not affect the readability of the document, and so that the checking information remains intact across the various manipulations it may encounter to on its way to the destination to enable the end-recipient to authenticate the document.

Another approach to authentication which applies well to images consists of hiding data in the digital representation of the images. To meet the above requirement, checking information is merged and hidden in the document itself. The hiding of data has received considerable attention mainly to protect the copyright attached to digital multimedia materials which can easily be copied and distributed everywhere through the Internet and networks in general. A good review of data hiding techniques is described in the publication entitled "Techniques for data hiding" by W. Bender et al., IBM Systems Journal, Vol. 35, Nos. 3 & 4, 1996. The most common form of high bit-rate encoding reported in the preceding publication is the replacement of the least significant luminance bit of image data with the embedded data. This technique is imperceptible (the alteration of the image is not noticeable) and may serve various purposes, similar to authentication. This includes watermarking (aimed at placing an indelible mark on an image) or tamper-proofing (to detect image alterations especially through the embedding of a MAC into the digital image).

In practice, in computing environments where users navigate across files on a network and activate hyperlinks from one file to another, there is no need to verify immediately each received document and all the various files that are hyperlinked to it. What is really needed is a mechanism, when a hyperlink is activated by the user, for verifying the authenticity and integrity of this hyperlink, and the authenticity and integrity of the file associated with this hyperlink. Under these circumstances, it would be advantageous to define an authentication method that associates the checking information of a linked file with the hyperlinked object itself from which the linked file is accessed (and not to the document comprising the hyperlinked object, as is the common practice taught by the prior art, for instance by appending or attaching a MAC file to the document).

To ensure that the linked file is authentic, it is important to receive this file from a trustworthy server (i.e., from an authenticated network address). Therefore, it is advantageous to define an authentication method that associates with the same hyperlinked object, not only the checking information of the linked file, but also the checking information of the network address of the file.

On a document comprising a plurality of hyperlinks, it would be advantageous to define a system and method for authenticating and verifying each individual hyperlink and each linked file. For doing that, checking information must be associated with each hyperlink object (and not with the document that contains the hyperlinked objects). In order not to affect the format and readability of the document, the checking information of each hyperlink must be encoded transparently into the hyperlink object itself. Furthermore, the checking information must remain intact across the various manipulations it encounters on its way to its destination, to enable the end-recipient to verify the authenticity and integrity of the hyperlink and its associated file.

Therefore, there is a need for an efficient system and method for securing and verifying the authenticity and integrity of hyperlinks (i.e., hyperlink network addresses and hyperlinked files), especially hyperlinks intended to be activated on unsecured computer networks.

There is a also need for a protocol-independent system and method for authenticating hyperlinks, so that the checking information of hyperlinks in a document remains intact across the various manipulations of this document.

There is also a need for a system and method for encoding and embedding the checking information of hyperlinks into the hyperlinks, so that the integrity of the hyperlink network addresses and the integrity of linked files or resources may be checked when these hyperlinks are activated, while preventing the checking information from being lost or separated from the hyperlinks.

In particular, there is a need for a system and method for encoding and embedding the checking information of a hyperlinked graphic object into this hyperlinked graphic object.

SUMMARY

The present invention is directed to methods and systems and computer program products for verifying the authenticity and integrity of hyperlink network addresses and files associated with the network addresses. The computer program products comprise a computer readable storage medium in a computer workstation.

The present invention discloses an authenticated hyperlink for accessing a file by means of a hyperlink address and for authenticating the hyperlink address and the file when the authenticated hyperlink is activated. The authenticated hyperlink comprises: a digital image; a first portion of the digital image comprising an encoded address of a file; and a second portion of the digital image comprising an encoded message authentication code based on the address of the file and the file.

The present invention also discloses a method for creating an authenticated hyperlink to access a file by means of a hyperlink address and to authenticate the hyperlink address and the file when the authenticated hyperlink is activated. The method comprises the steps of:
  creating or selecting a digital image;
  encoding the address of a file in a first portion of the digital image;
  computing a message authentication code based on the address of the file and the file; and
  encoding the computed message authentication code in a second portion of the digital image.

The present invention also discloses a method for activating an authenticated hyperlink that includes a digital image. The method comprises the steps of:
  extracting from a first portion of the digital image, an encoded address of a file;
  decoding the encoded address;
  extracting from a second portion of the digital image, an encoded message authentication code;
  decoding the encoded message authentication code;
  accessing and retrieving the file corresponding to the decoded address;
  computing a computed message authentication code by means of a hash function identical to the hash function used to compute the message authentication code encoded in the digital image;
  comparing the computed message authentication code with the decoded message authentication code; and
  if the computed message authentication code and the decoded message authentication code are identical, processing the file as being an authentic file.

BRIEF DESCRIPTION OF THE DRAWINGS

The invention, as well as a preferred mode of use, further objects and advantages thereof, will best be understood by reference to the following detailed description of an illustrative detailed embodiment when read in conjunction with the accompanying drawings, wherein.

DETAILED DESCRIPTION

Systems and methods are disclosed for authenticating a file (e.g., an HTML document) linked to a graphic object (e.g. digital image, graphic icon, and so forth). Checking information computed from the hyperlink network address of the linked file (e.g., the URL of the linked file on the Internet) and of the linked file is encoded into this graphic object. The authenticity and the integrity of both, the hyperlink network address and the linked file that is accessed and retrieved through the network by means of the network address, is verified when the hyperlink is activated from the graphic object.

In a preferred embodiment, to authenticate a file linked to a graphic object, the network address of the file (e.g., the URL of the linked file on the Internet) is encoded into a first portion of the graphic object. Then, by means of any cryptographic function, using a key, checking information based on a combination of the hyperlink network address and of the linked file is computed and encoded into a second portion of the graphic object, generating an authenticated hyperlinked graphic object. This authenticated hyperlinked graphic object encodes both the hyperlink network address needed to locate the linked file on the network and the information needed to check the authenticity and the integrity of the hyperlink address and linked file. The resulting authenticated graphic object can then be included into or attached to any document that refers to the file (e.g., on an HTML Web page).

When a user activates a hyperlink by pointing and clicking on a hyperlinked graphic object according to the present invention, a hyperlink network address (e.g., the URL of the linked file) is extracted and decoded from a first portion of this graphic object. Similarly, encoded checking information is extracted and decoded from a second portion of this graphic object. The linked file is accessed and retrieved using the extracted network address. The checking information based on the combination of the hyperlink network address and on the retrieved file is then computed, and compared with the checking information extracted and decoded from the same graphic object. The linked file and its network address can be considered authentic if both the checking information extracted and decoded from the graphic object and the checking information computed from the received file are identical.

Note that the expressions "graphic object", "digital image" or "graphic icon" refer to the same concept and will be used indifferently in the following description. The expressions "checking information", "digital signature", "message authentication code" refer to the same concept and will also be used indifferently in the following description.

Document Authentication

Figure 1:
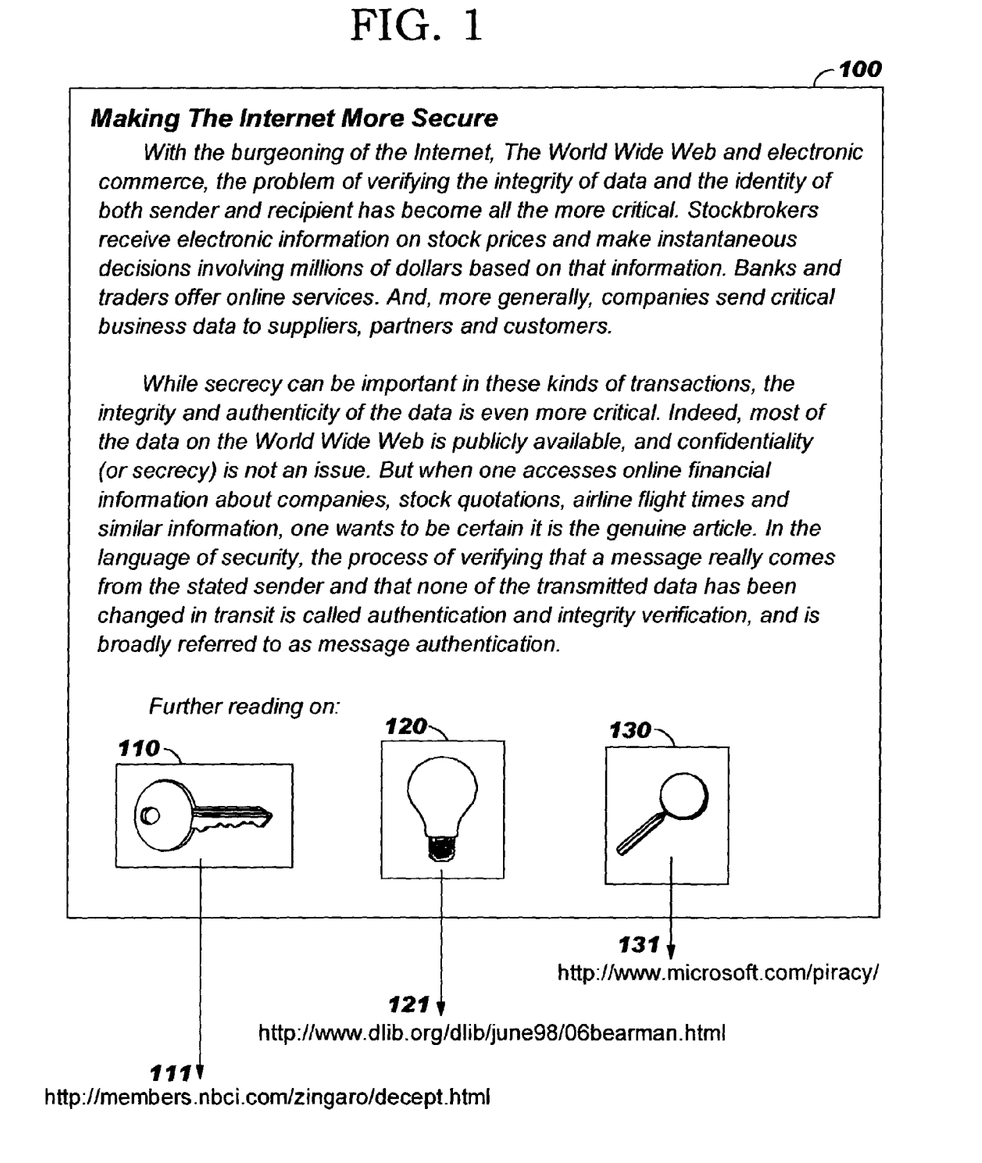
FIG. 1 shows a document with a plurality of graphic objects (icons) hyperlinked to files located on network servers according to the present invention.

The present invention discloses a method for ensuring the authenticity and the integrity of documents that are retrieved from one or more network servers when a user navigates from one document to another by activating hyperlinks. FIG. 1 shows an electronic document (100) comprising a plurality of graphic objects (icons) (110, 120, 130) hyperlinked to files (111, 121) or websites (131) located on the Internet network. Different possible approaches for authenticating documents are:

computing a signature based on an aggregate of the document (100) and of all the files (111), (121), (131) that are linked to this document, and attaching this signature to this document (100).

computing a signature for the document (100) and for each file (111), (121), (131) linked to this document. A signature file, comprising all the signatures, is attached to the document (100).

computing a signature for each linked file (111), (121), (131) and encoding each signature in the corresponding hyperlinked object (110), (120), (130).

This last approach is the one that is applied in the present invention.

Figure 2:
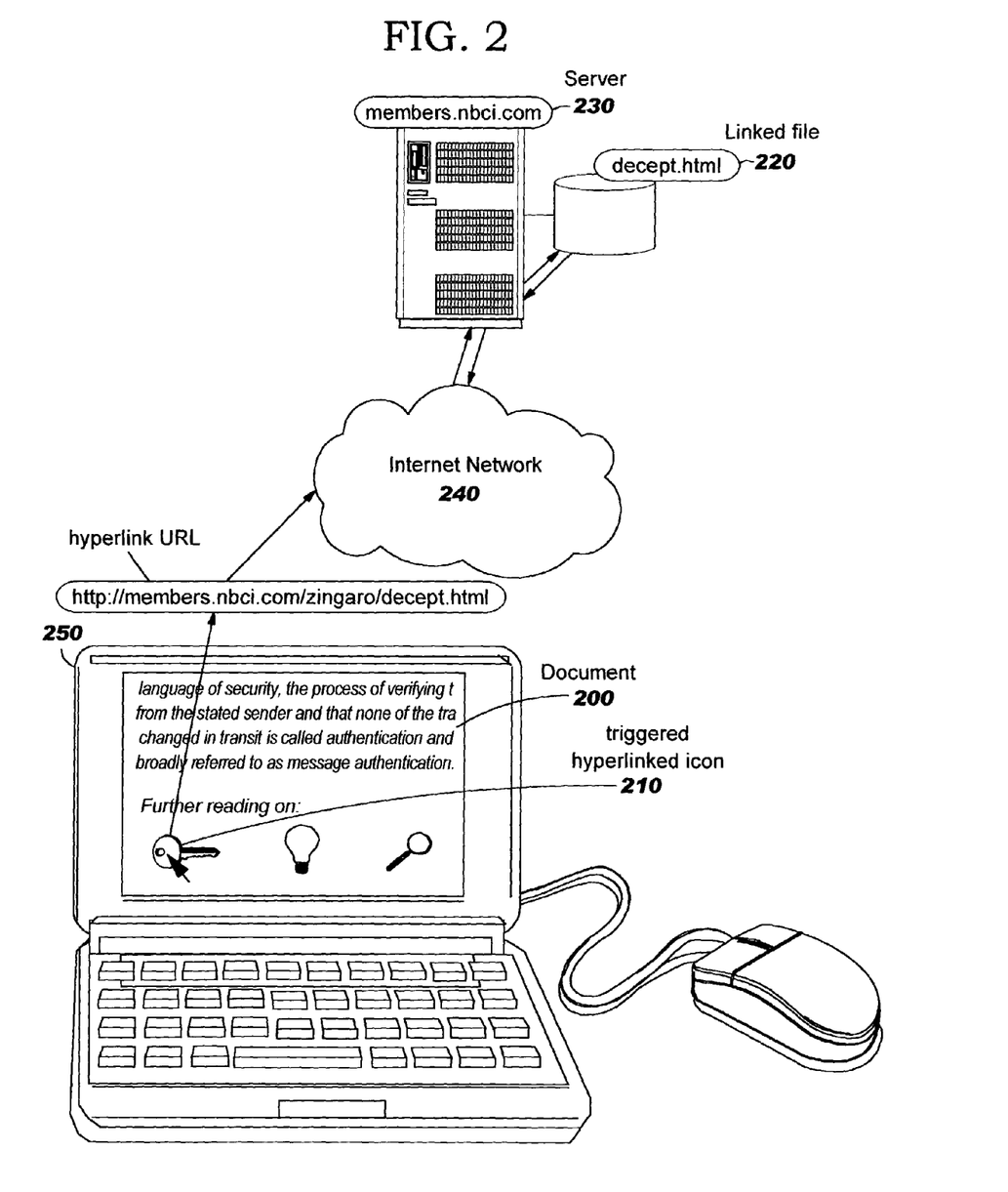
FIG. 2 illustrates the mechanism by which a user activates a hyperlink from a graphic object and access a file on a server through the network according to the present invention.

FIG. 2 illustrates the mechanism by which a user activates a hyperlink from a graphic object (e.g., an icon) (210) on a document (200) to a file (220) located on a server (230) connected to a network (240). FIG. 2 shows how the file (220) is accessed on the server (230) and sent back to the user workstation (250). In this scenario, when the user activates the hyperlink (210), he wants to be sure that the file (220) he receives is sent by a trustworthy server (230) before exposing his computer system (250) to a file that may include a "Trojan Horse" or may infect the computer with a virus. For the user that receives the file, it is necessary to verify that the file has not been corrupted or otherwise altered in some manner. The user needs also to verify that the file has been sent by a known and authorized sender and not by an impostor.

Authenticated Hyperlink

Figure 3:
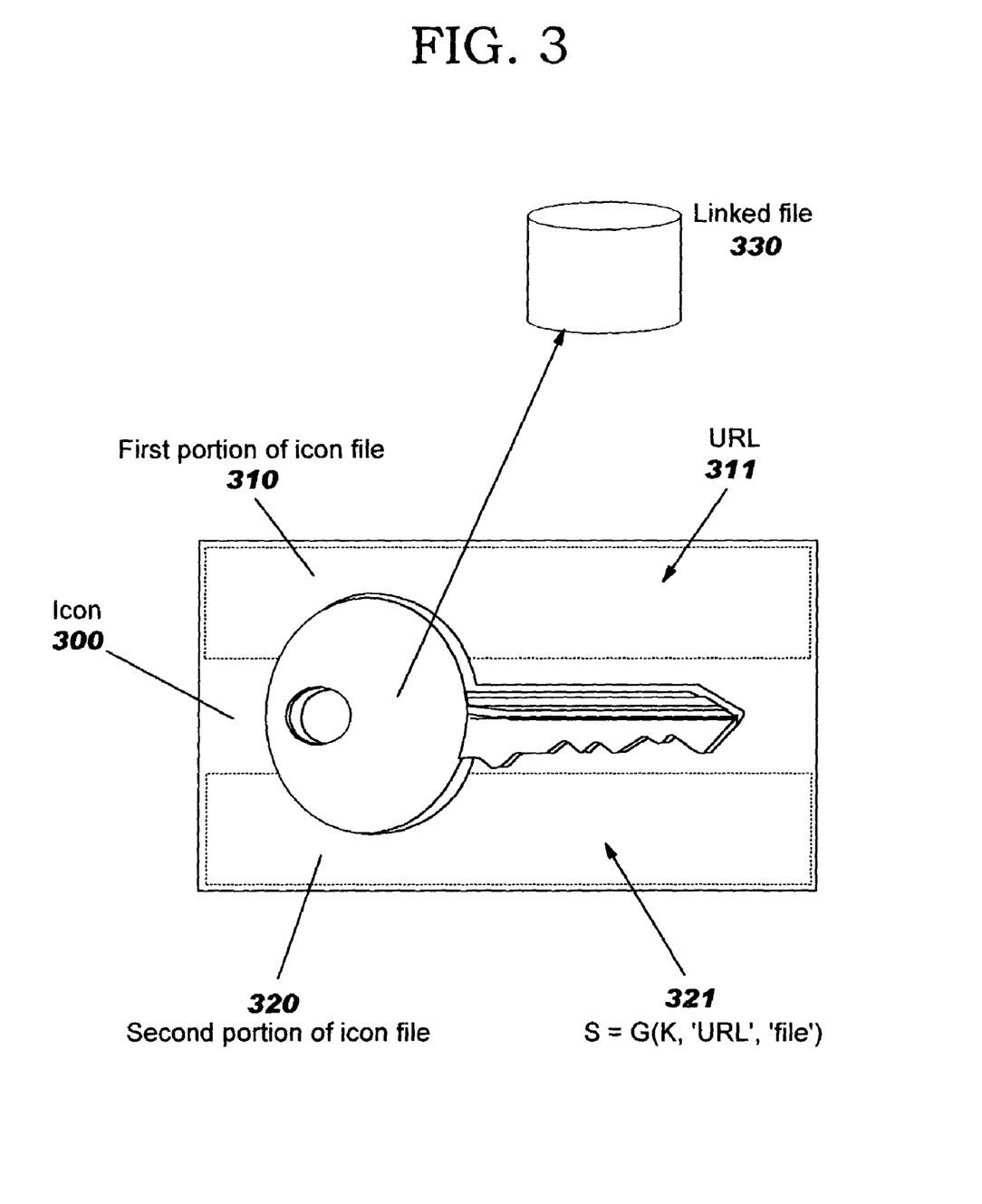
FIG. 3 shows an authenticated hyperlink from a graphic object to a file according to the present invention.

FIG. 3 shows an authenticated hyperlink from a graphic object (300) to a file (330) located on a network server according to the present invention. The network address (for instance the URL—Uniform Resource Locator) (311) of the file is encoded into a first portion (310) of the graphic object and the checking information S (321), which is a function G of the network address (URL) and the file that can be accessed at the network address is encoded into a second portion (320) of the graphic object. The checking information is equal to:

S=G[K, "URL", "file"]

where

S is the checking information

G is a cryptographic function,

K is a secret key,

"URL" is the hyperlink network address of the file, and

"file" is the file located on the server at the network address "URL".

Cryptographic Function

Figure 4:
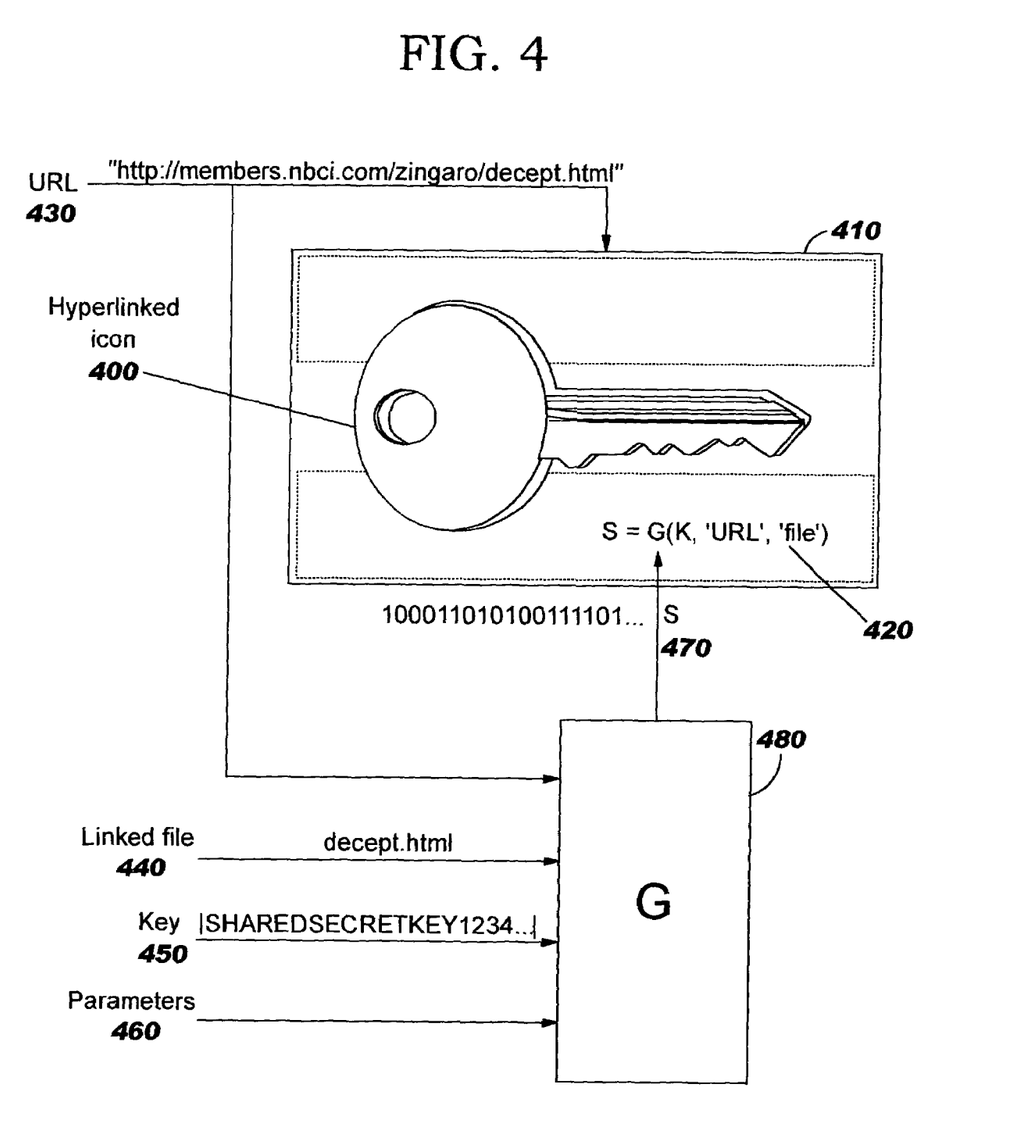
FIG. 4 describes the function used for computing the checking information based on the hyperlink network address (URL) and the file linked to the hyperlink network address according to the present invention.

FIG. 4 shows in more detail a preferred embodiment of the present invention. The network address of the file ("URL") (430) is encoded into pixels (410) located in a first portion of the hyperlinked graphic object (400). The output S (470) of the cryptographic function G (480) based on the network address ("URL") (430) and on the file (440) linked to this network address ("URL") is encoded into pixels (420) located in a second portion of the same hyperlinked graphic object (400).

The function G (480) can be implemented in many ways using techniques and methods well known by those skilled in the art. Irrespective of the way function G is actually implemented, it is assumed to be able to generate an output S (470) based on four types of entries.

First, S is function of the text string encoding the network address (430), or "URL" (e.g., "http://members.nbci.com/zingaro/decept.html").

Second, S is function of the 'file' (440) corresponding to the network address, or URL (430), (e.g., decept.html).

Third, S is also function of a key (450), an alphanumeric text string shared by the parties involved in the authentication process. The key should be kept secret.

Fourth, S is finally function of a set of parameters (460), aimed at specifying the way the function G should process the preceding entries: "URL" (430), "file" (440) and key (450). This set of parameters specify in particular the type and format of the output S for a particular instance of the function. For example, a parameter (460) may be set to request function G to generate a string of 128 binary bits (470).

Those skilled in the art will recognize that function G (480), such as described above, can be implemented, for example, using a one-way hash function for producing a unique digest of the "URL" (430), "file" (440) and secret key (450), the digest being dependent of input parameters (460). These input parameters can be used to specify, for instance, a number of bits so that the output S (470) can be encoded into the pixels of the region (420) reserved for this purpose in the hyperlinked graphic object (400). One-way hash functions, which are used for many other purposes like compression, have recently received considerable attention and are at the center of modern cryptography. A good review can be found in the book entitled *"Applied Cryptography"* by Bruce Schneier, published by John Wiley & Sons, 2nd edition, 1996.

In a preferred embodiment of the invention, the "URL" (430) and the linked "file" (440) are first concatenated and then, using a secret key K, a MAC (Message Authentication Code) is computed. For example, by means of the HMAC mechanism, used with the iterative cryptographic hash function SHA-1 (Secure Hash Algorithm-1) in combination with the secret shared key, a MAC of 160 bits can be generated. This MAC is the binary string S (470) that will be used in the next step of the authentication process.

Encoding

The next step is to encode the hyperlink network address ("URL") (430) and the checking information string S (470) into the hyperlinked graphic object (400). Any plain text, ciphertext, other images, or anything that can be embedded in a bit stream may be encoded and hidden in an image. Image steganography has come quite far in recent years with the development of fast, powerful graphical computers, and steganographic software is now readily available over the Internet for everyday users. For purposes of the invention, information may be encoded in many different ways in images or icons. Straight message insertion can be done simply by encoding every bit of information in the image. A more complex encoding can be done by embedding the message only in "noisy" areas of the image (in areas of the image attracting less attention of the user). The message may also be scattered randomly throughout the image.

According to the particular embodiment shown in FIG. 4, the "URL" (430) is encoded sequentially in a first region (410), starting from the first pixel of the hyperlinked graphic object (400). The checking information string S (470) is sequentially encoded in a second region, in the last group of pixels (420) of the hyperlinked graphic object (400). According to another possible embodiment, a fixed number of pixels is reserved for encoding the checking information string S (470), followed by a variable number of pixels (with a delimiting mark at the end) for encoding the "URL" (430).

Among the different approaches for encoding and hiding information in images (e.g., least significant bit (LSB) insertion, masking and filtering techniques, algorithms and transformations), the least significant bit insertion method is probably the most common technique for encoding images. It is a simple approach for embedding information in a graphical image file. When applying LSB techniques to each byte of an 8-bit image, one bit is encoded into each pixel (as each pixel is represented by one byte). Normally, changes in LSB pixel bits are invisible to the human eye, in particular when greyscale palettes are used. The main advantage of LSB insertion is that the human eye is unable to notice it, because data is encoded in the least significant bits. This method is very convenient for embedding the "URL" (430) and the checking information string S (470) into the hyperlinked graphic object (400) according to the present invention.

Creation of Authenticated Hyperlinks

Figure 5:
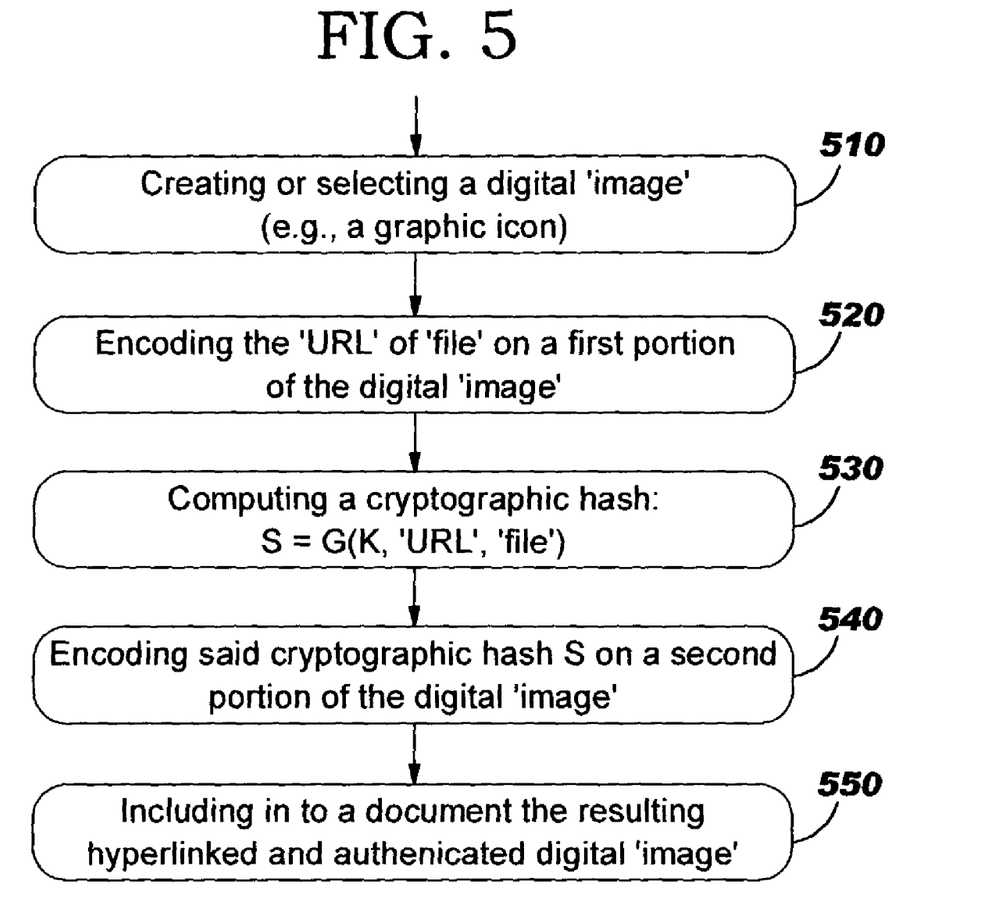
FIG. 5 shows the steps of the method for creating an authenticated hyperlink from a graphic object to a file on a network server according to the present invention.

As illustrated in the next figures, the invention discloses a method for creating authenticated hyperlinks from digital images to files and for verifying the authenticity and integrity of the files when the authenticated hyperlinks are activated. FIG. 5 depicts the steps of creating an authenticated hyperlink from a digital image to a file located on a network server. Given a file accessible through a network by means of a network address ("URL"), the method comprises the following steps of:

(510) creating or selecting a digital image, (e.g., a small digital picture, graphic object or icon) intended to be linked to a file accessible on a server by means of a network address ("URL").

(520) by means of any of the techniques known by those skilled in the art, encoding the network address ("URL") of the file in a first portion (i.e., in a first subset of pixels) of said digital image.

(530) by means of any of the methods known by those skilled in cryptography, generating a cryptographic hash "S". This cryptographic hash (i.e. "Message Authentication Code", or MAC) can be computed, for example, using a one-way hash function G with, in input, the network address ("URL") of the file, the "file", and a secret key K. Particular parameters may be entered in the function G to specify the type and format of the output string "S".

(540) encoding the computed cryptographic hash "S" in a second portion (i.e., in a second subset of pixels) of the digital image.

(550) including into or attaching to a document that refers to (i.e., that is hyperlinked to) this file the resulting hyperlinked and authenticated digital image.

The document comprising the hyperlinked authenticated digital image can be transmitted to (or alternatively can be accessed from) another computing system. Alternatively the hyperlinked authenticated digital image can be saved on a disk as a portable icon file.

Authentication of Network Address and File

Figure 6:
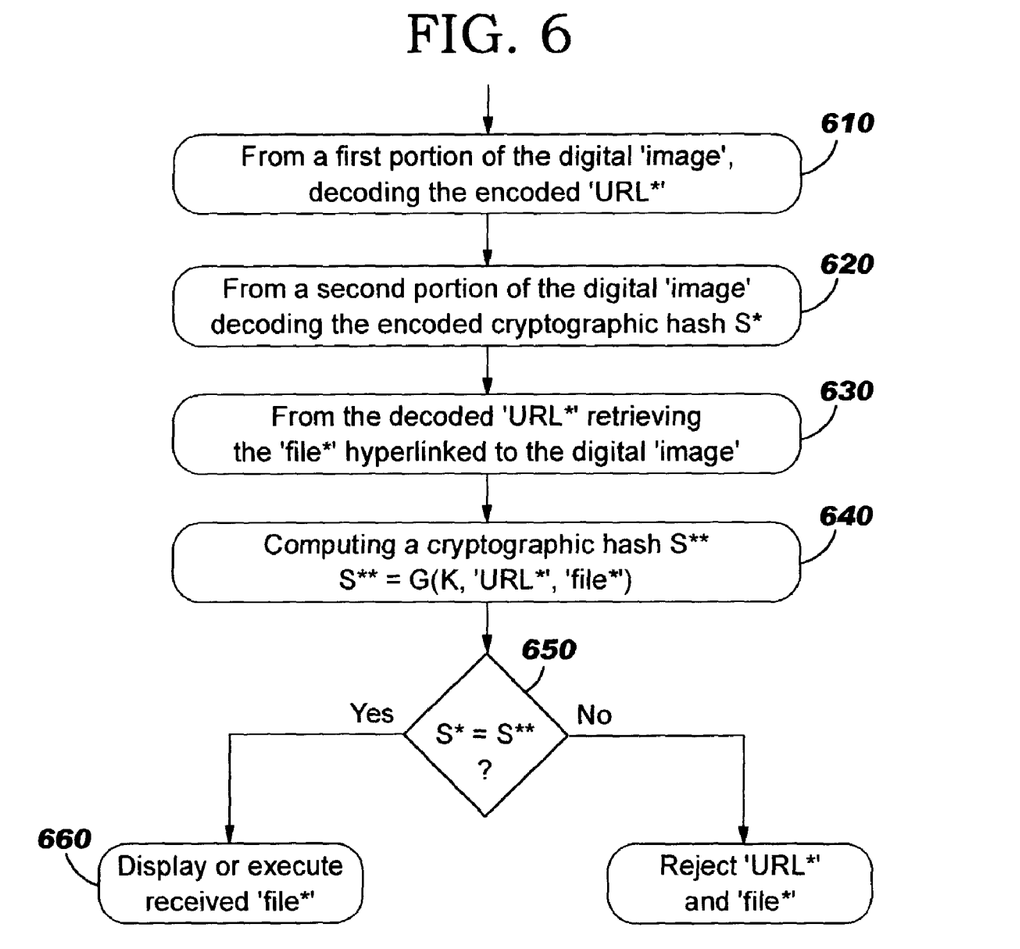
FIG. 6 shows the steps of the method for activating a hyperlink from an authenticated hyperlinked graphic object and for verifying the authenticity and integrity of the hyperlink destination address (URL) and the linked file, accordingly to the present invention.

FIG. 6 shows the steps of the method for activating an authenticated hyperlink and for verifying the authenticity and integrity of the hyperlink network address and the file accessed using this hyperlink network address when the authenticated hyperlink is activated. When the user activates a hyperlink from a hyperlinked authenticated digital image, the activation and verification process executes the steps of:

(610) from a first portion of the digital image, extracting and decoding the encoded network address ("URL*").

(620) from a second portion of the digital image, extracting and decoding the encoded cryptographic hash ("S*").

(630) from the decoded network address ("URL*"), accessing and retrieving through the network, the "file*" hyperlinked to the digital image.

(640) computing by means of the cryptographic function ("G") described previously, a digest ("S"), this digest ("S") being a function of the decoded "URL*", the retrieved "file*", and the key K, such as "S**"=G(K, "URL*", "file*").

(650) comparing the computed cryptographic digest "S**" with the value "S*" decoded from the digital image.

If the computed cryptographic digest "S**" is identical to the value "S*" decoded from the digital image, then the network address ("URL*") and the retrieved "file*" are both authentic; otherwise, they are rejected as fake.

(660) if the retrieved "file*" and the network address ("URL*") are both positively authenticated, processing (displaying or executing) the received "file*" (e.g., by means of a Web browser, a plug-in, or an editor program).

Advantages

To summarize, the present invention encodes the checking information of files hyperlinked to digital images (or graphic objects) into these digital images.

enables an individual authentication of hyperlinked files.

introduces the notion of "authenticated hyperlinks". "Authenticated hyperlinks" are objects that can be transferred from a document to another (or attached to different documents) while encoding hyperlinks network addresses (URLs) and checking information of the hyperlinked files.

allows hiding the checking information of the hyperlinked files in the hyperlinked digital images, in a practically invisible manner, keeping intact the format and visual appearance of the document.

allows authentication of the document in a protocol-independent way, so that the checking information remains intact across the various manipulations it encounters on its way to its destination, in particular through the different networks and systems.

can be applied to many different software packages (e.g., e-mail systems) generating documents with graphic links (hyperlinks) to all types of files. The authentication method is "protocol and data format independent".

While the invention has been particularly shown and described with reference to a preferred embodiment, it will be understood that various changes in form and detail may be made therein without departing from the spirit, and scope of the invention.

What is claimed is:

1. A method for creating an authenticated hyperlink to access a file by means of a hyperlink address and to authenticate said hyperlink address and said file when said authenticated hyperlink is activated, said method comprising the steps of:

providing a digital image;

encoding the address of a file in a first portion of said digital image, said address of the file being a Uniform Resource Locator (URL) that includes a network address of the file;

computing a message authentication code based on the address of the file and the file;

encoding the computed message authentication code in a second portion of said digital image, wherein the message authentication code is computed using a hash function having as inputs the address of the file, the file, and a secret key K, and after said encoding the address of a file in the first portion of said digital image and after said encoding the computed message authentication code in the second portion of said digital image, a computer workstation storing the digital image in a storage device comprised by the computer workstation.

2. The method according to claim 1, wherein the hash function comprises an additional input of a set of parameters that specify a type and format of an output of an instance of the hash function.

3. The method according to claim 1, further comprising the step of:

embedding the created authenticated hyperlink in an electronic document.

4. The method according to claim 1, wherein the file is located on a server connected to a network.

5. The method according to claim 1, wherein the hash function computes the message authentication code by forming a concatenation of the address of the file and the file, and computing a Message Authentication Code (MAC) of the formed concatenation using the secret key K.

6. The method according to claim 1, wherein the first and second portions of the digital image are different and non-overlapping portions of the digital image.

7. The method according to claim 3, wherein the address of the electronic document differs from the address encoded in the first portion of the digital image, wherein the method further comprises authenticating the address of the file encoded in the first portion of the digital image and the file upon being accessed, and wherein said authenticating comprises the steps of:

extracting and decoding the address of the file encoded in the first portion of the digital image;

extracting and decoding the computed message authentication code encoded in the second portion of the digital image;

accessing and retrieving the file through use of the decoded address of the file;

computing a cryptographic digest by using a hash function having as inputs the decoded address of the file, the retrieved file, and the secret key K, said using the hash function resulting in the cryptographic digest; and determining that the computed cryptographic digest is equal to the decoded message authentication code.

8. A computer program product, comprising a computer readable storage medium in a computer workstation, said storage medium having a computer program stored therein, said computer program configured to be executed by a computer to perform a method for creating an authenticated hyperlink to access a file by means of a hyperlink address and to authenticate said hyperlink address and said file when said authenticated hyperlink is activated, said method comprising the steps of:

providing a digital image;

encoding the address of a file in a first portion of said digital image, said address of the file being a Uniform Resource Locator (URL) that includes a network address of the file;

computing a message authentication code based on the address of the file and the file;

encoding the computed message authentication code in a second portion of said digital image, wherein the message authentication code is computed using a hash function having as inputs the address of the file, the file, and a secret key K, and after said encoding the address of a file in the first portion of said digital image and after said encoding the computed message authentication code in the second portion of said digital image, storing the digital image in a storage device comprised by the computer workstation.

9. The computer program product according to claim 8, wherein the hash function comprises an additional input of a set of parameters that specify a type and format of an output of an instance of the hash function.

10. The computer program product according to claim 8, further comprising the step of:

embedding the created authenticated hyperlink in an electronic document.

11. The computer program product according to claim 8, wherein the file is located on a server connected to a network.

12. The computer program product according to claim 8, wherein the hash function computes the message authentication code by forming a concatenation of the address of the file and the file, and computing a Message Authentication Code (MAC) of the formed concatenation using the secret key K.

13. The computer program product according to claim 8, wherein the first and second portions of the digital image are different and non-overlapping portions of the digital image.

14. The computer program product according to claim 10, wherein the address of the electronic document differs from the address encoded in the first portion of the digital image, wherein the method further comprises authenticating the address of the file encoded in the first portion of the digital image and the file upon being accessed, and wherein said authenticating comprises the steps of:

extracting and decoding the address of the file encoded in the first portion of the digital image;

extracting and decoding the computed message authentication code encoded in the second portion of the digital image;

accessing and retrieving the file through use of the decoded address of the file;

computing a cryptographic digest by using a hash function having as inputs the decoded address of the file, the retrieved file, and the secret key K, said using the hash function resulting in the cryptographic digest; and determining that the computed cryptographic digest is equal to the decoded message authentication code.

* * * * *